(12) United States Patent
Minevski et al.

(10) Patent No.: US 6,395,106 B1
(45) Date of Patent: May 28, 2002

(54) CONVERSION COATINGS PREPARED OR TREATED WITH CALCIUM HYDROXIDE SOLUTIONS

(75) Inventors: Zoran Minevski, The Woodlands; Eric Clarke, Bryan; Jason Maxey, College Station; Carl Nelson, Bryan; Cahit Eylem, College Station, all of TX (US)

(73) Assignee: Lynntech, Inc., College Station, TX (US)

( * ) Notice: Subject to any disclaimer, the term of this patent is extended or adjusted under 35 U.S.C. 154(b) by 0 days.

(21) Appl. No.: 09/499,243

(22) Filed: Feb. 7, 2000

(51) Int. Cl.[7] ............................................... C23C 28/00
(52) U.S. Cl. ....................... 148/276; 148/256; 148/263; 148/265; 427/327; 427/343
(58) Field of Search ................................ 148/256, 265, 148/263, 276; 427/327, 343; 252/178, 387; 210/900

(56) References Cited

U.S. PATENT DOCUMENTS

| | | | |
|---|---|---|---|
| 3,365,313 A | | 1/1968 | Roberts, Jr. |
| 3,726,721 A | * | 4/1973 | Wittrock et al. ............ 148/273 |
| 3,960,676 A | | 6/1976 | Miyosawa |
| 4,435,256 A | | 3/1984 | Deininger |
| 4,435,257 A | | 3/1984 | Deininger |
| 4,451,338 A | | 5/1984 | Deininger |
| 4,551,326 A | | 11/1985 | Thompson |
| 4,606,843 A | | 8/1986 | Kaezur |
| 4,755,224 A | | 7/1988 | Bibber |
| 4,828,615 A | | 5/1989 | Cape |
| 4,878,963 A | | 11/1989 | Bibber |
| 5,217,584 A | | 6/1993 | Deininger |
| 5,472,734 A | * | 12/1995 | Perrotta et al. ................ 427/2 |
| 5,637,143 A | | 6/1997 | Jenkins |
| 5,746,994 A | | 5/1998 | Johnson |

FOREIGN PATENT DOCUMENTS

DK     0 724 653 B1     11/1990

OTHER PUBLICATIONS

K. Bouzek, I. Rousar, Influence of anode material on current yields during ferrate (vi) production by anodic iron dissolution Part I: Current efficiency during anodic dissolution of grey cast iron to ferrate (vi) in concentrated alkali hydroxide solutions, revised Nov. 28, 1995 pp. 919 to 923.

K. Bouzek, I Rousar, M.A. Taylor, Influence of anode material on current yields during ferrate (vi) production by anodic iron dissolution Part II, Current efficency during anodic dissolution white cast iron to ferrate (iv) in concentrated alkali hydroxide solutions, revised Jan. 11, 1996 pp. 925–931.

K. Bouzek, I Rousar, Current efficiency during anodic dissolution of iron to ferrate (vi) in concentrated alkali hydroxide solutions revised Apr. 23, 1993 pp. 1317–1322.

A. Denvir, D. Pletcher, Electrochemical generation of ferrate Part I: Dissolution of an iron wool bed anode, revised Oct. 31, 1995 pp. 815–821.

A. Denvir, D. Pletcher, Electrochemical generation of ferrate Part 2: Influence of anode composition revised Oct. 31, 1995 pp. 823–827.

Lionel Delaude and Pierre Laszlo, A Novel Oxidizing Reagent Based on Potassium Ferrate (VI) Apr. 5, 1996 pp. 6360–6370.

Henry J. Hrostowski and Allen B. Scott, The Magnetic Susceptibility of Potassium Ferrate, Jun. 10, 1949. pp. 105–107.

G.W. Thompson, L.T. Ockerman and J.M. Schreyer, Preparation and Purification of Potassium Ferrate VI, Aug. 9, 1950, pp. 1379–1381.

\* cited by examiner

*Primary Examiner*—John Sheehan
*Assistant Examiner*—Andrew L. Oltmans
(74) *Attorney, Agent, or Firm*—Streets & Steele; Jeffrey L. Streets

(57) ABSTRACT

A conversion coating process that forms a stable and corrosion-resistant oxide layer on metal or metal oxide substrates or layers. Particularly, the conversion coating process involves contacting the metal or metal oxide substrate or layer with the aqueous calcium hydroxide solutions in order to convert the surface of the substrate to a stable metal oxide layer or coating. According to the present invention, the calcium hydroxide solution is prepared by removing carbon dioxide from water or an aqueous solution before introducing the calcium hydroxide. In this manner, formation of calcium carbonate particles is avoided and the porosity of the conversion coating produced by the calcium hydroxide solution is reduced to below about 1%.

52 Claims, 5 Drawing Sheets

| Corresponding Example | Boehmite | Conversion Solution* | | Ca(OH)$_2$ Post-Sealant | | Corrosion Performance |
|---|---|---|---|---|---|---|
| | | Main Component (wt%) | Additives (wt%) | Fresh Solution | Aged Solution | Salt Fog Results (days) |
| A 1 | YES | no conversion step | | NONE | | 1 |
| A 2 | YES | no conversion step | | YES | NO | 5 |
| A 3 | YES | 3% Na$_2$MoO$_4$ | NONE | NONE | | 3 |
| A 3 | YES | 3% KMnO$_4$ | NONE | NONE | | 3 |
| A 3 | YES | 2% H$_3$PMo$_{12}$O$_{40}$ | NONE | NONE | | 3 |
| A 3 | YES | 0.17% Na$_2$FeO$_4$ | 1.5% KMnO$_4$ 1.5% Na$_2$MoO$_4$ 1% NaNO$_3$ | NONE | | 1 |
| A 4 | YES | 3% Na$_2$MoO$_4$ | NONE | YES | NO | 21 |
| A 4 | YES | 3% KMnO$_4$ | NONE | YES | NO | 23 |
| A 4 | YES | 2% H$_3$PMo$_{12}$O$_{40}$ | NONE | YES | NO | 20 |
| A 4 | YES | 0.17% Na$_2$FeO$_4$ | 1.5% KMnO$_4$ 1.5% Na$_2$MoO$_4$ 1% NaNO$_3$ | YES | NO | 40+ |
| A 5 | YES | no conversion step | | NO | YES | 1 |
| A 5 | YES | 3% Na$_2$MoO$_4$ | NONE | NO | YES | 3 |
| A 5 | YES | 3% KMnO$_4$ | NONE | NO | YES | 4 |
| A 5 | YES | 2% H$_3$PMo$_{12}$O$_{40}$ | NONE | NO | YES | 2 |
| A 5 | YES | 0.17% Na$_2$FeO$_4$ | 1.5% KMnO$_4$ 1.5% Na$_2$MoO$_4$ 1% NaNO$_3$ | NO | YES | 2 |
| A 6 | YES | | | YES (no nitrates) | NO | 1 |
| A 6 | YES | 3% Na$_2$MoO$_4$ | NONE | YES (no nitrates) | NO | 3 |
| A 6 | YES | 3% KMnO$_4$ | NONE | YES (no nitrates) | NO | 4 |
| A 6 | YES | 2% H$_3$PMo$_{12}$O$_{40}$ | NONE | YES (no nitrates) | NO | 2 |
| A 6 | YES | 0.17% Na$_2$FeO$_4$ | 1.5% KMnO$_4$ 1.5% Na$_2$MoO$_4$ 1% NaNO$_3$ | YES (no nitrates) | NO | 2 |

*All conversion coatings were applied for 2 minutes at 80°C.

Figure 1 – Calcium Hydroxide

| Corresponding Example | Boehmite | Conversion Solution | | | Post-Sealants | | Corrosion Performance |
|---|---|---|---|---|---|---|---|
| | | Heteropoly-molybdate (2 wt%) | Additives (wt%) | Temp (°C) | $Ca(OH)_2$ | Silicate | Salt Fog Results (days) |
| B 1 | YES | no conversion step | | | NO | NO | 1 |
| B 2 | YES | $H_3PMo_{12}O_{40}$ | NONE | 80 | NO | NO | 3 |
| B 3 | YES | $H_3PMo_{12}O_{40}$ | 0.5% $Na_2SiF_6$ 1% $KMNO_4$ | 80 | NO | NO | 4 |
| B 5 | YES | $H_3PMo_{12}O_{40}$ | NONE | 25 | YES | YES | 7 |
| B 5 | YES | $H_3PMo_{12}O_{40}$ | NONE | 60 | YES | YES | 10 |
| B 5 | YES | $H_3PMo_{12}O_{40}$ | NONE | 80 | YES | YES | 20 |
| B 6 | YES | $H_3PMo_{12}O_{40}$ | 0.5% $Na_2SiF_6$ | 25 | YES | YES | 13 |
| B 6 | YES | $H_3PMo_{12}O_{40}$ | 0.5% $Na_2SiF_6$ 1% $KMNO_4$ | 25 | YES | YES | 18 |
| B 6 | YES | $H_3PMo_{12}O_{40}$ | 0.5% $Na_2SiF_6$ | 60 | YES | YES | 17 |
| B 6 | YES | $H_3PMo_{12}O_{40}$ | 0.5% $Na_2SiF_6$ 1% $KMNO_4$ | 60 | YES | YES | 14 |
| B 6 | YES | $H_3PMo_{12}O_{40}$ | 0.5% $Na_2SiF_6$ | 80 | YES | YES | 18 |
| B 6 | YES | $H_3PMo_{12}O_{40}$ | 0.5% $Na_2SiF_6$ 1% $KMNO_4$ | 80 | YES | YES | 4 |
| B 2 | YES | $Na_4SiMo_{12}O_{40}$ | NONE | 80 | NO | NO | 3 |
| B 5 | YES | $Na_4SiMo_{12}O_{40}$ | NONE | 25 | YES | YES | 8 |
| B 5 | YES | $Na_4SiMo_{12}O_{40}$ | NONE | 60 | YES | YES | 10 |
| B 5 | YES | $Na_4SiMo_{12}O_{40}$ | NONE | 80 | YES | YES | 20 |
| B 2 | YES | $H_4SiMo_{12}O_{40}$ | NONE | 80 | NO | NO | 2 |
| B 5 | YES | $H_4SiMo_{12}O_{40}$ | NONE | 25 | YES | YES | 13 |
| B 5 | YES | $H_4SiMo_{12}O_{40}$ | NONE | 60 | YES | YES | 19 |
| B 5 | YES | $H_4SiMo_{12}O_{40}$ | NONE | 80 | YES | YES | 20 |

Figure 2 – Heteropolymetalate Conversion Coatings

| Corresponding Example | Boehmite | Conversion Solution Conditions ||||| Post-Sealants || Corrosion Performance |
|---|---|---|---|---|---|---|---|---|---|
| | | Ferrate (mM) | pH | Additives | Temp (°C) | Time | Ca(OH)$_2$ | Silicate | Salt Fog Results (days) |
| C 1 | Yes | no conversion step ||||| No | No | 1 |
| C: 2, 3, 4, 5 | Yes | same as Examples 7, 8, 9, and 10 ||||| No | No | 3 |
| C 7 | No | 50 | 14 | No | 25 | 10 sec | Yes | Yes | 12 |
| C 7 | Yes | 3 | 14 | No | 25 | 1 min | Yes | Yes | 8 |
| C7 | Yes | 10 | 14 | No | 25 | 1 min | Yes | Yes | 16 |
| C7 | Yes | 25 | 14 | No | 25 | 5 sec | Yes | Yes | 34 |
| C7 | Yes | 50 | 14 | No | 25 | 1 min | Yes | Yes | 14 |
| C7 | Yes | 80 | 14 | No | 25 | any | Yes | Yes | 1 |
| C7 | Yes | 3 | 14 | No | 80 | 2 min | Yes | Yes | 6 |
| C7 | Yes | 10 | 14 | No | 80 | 2 min | Yes | Yes | 10 |
| C7 | Yes | 25 | 10 | No | 25 | 5 sec | Yes | Yes | 20 |
| C7 | Yes | 25 | 11 | No | 25 | 5 sec | Yes | Yes | 13 |
| C7 | Yes | 25 | 12 | No | 25 | 5 sec | Yes | Yes | 11 |
| C7 | Yes | 25 | 13 | No | 25 | 5 sec | Yes | Yes | 2 |
| C8 | No | 10 | 14 | 1.5%KMnO$_4$, 1.5% K$_2$MoO$_4$, 1% NaNO$_3$ | 80 | 2 min | Yes | Yes | 38 |
| C 8 | Yes | 3 | 14 | 1.5%KMnO$_4$, 1.5% K$_2$MoO$_4$, 1% NaNO$_3$ | 25 | 5 min | Yes | Yes | 1 |
| C8 | Yes | 3 | 14 | 3% K$_2$MoO$_4$, 1% NaNO$_3$ | 80 | 2 min | Yes | Yes | 10 |
| C8 | Yes | 3 | 14 | 3% KMnO$_4$, 1% NaNO$_3$ | 80 | 2 min | Yes | Yes | 14 |
| C8 | Yes | 3 | 14 | 1.5%KMnO$_4$, 1.5% K$_2$MoO$_4$, 1% NaNO$_3$ | 80 | 2 min | Yes | Yes | 19 |
| C8 | Yes | 10 | 14 | 3% K$_2$MoO$_4$, 1% NaNO$_3$ | 80 | 2 min | Yes | Yes | 16 |
| C8 | Yes | 10 | 14 | 3% KMnO$_4$, 1% NaNO$_3$ | 80 | 2 min | Yes | Yes | 21 |
| C8 | Yes | 10 | 14 | 1.5%KMnO$_4$, 1.5% K$_2$MoO$_4$, 1% NaNO$_3$ | 80 | 2 min | Yes | Yes | 40+ |
| C8 | Yes | 10 | 10 | 1.5%KMnO$_4$, 1.5% K$_2$MoO$_4$, 1% NaNO$_3$ | 80 | 2 min | Yes | Yes | 24 |
| C8 | Yes | 10 | 11 | 1.5%KMnO$_4$, 1.5% K$_2$MoO$_4$, 1% NaNO$_3$ | 80 | 2 min | Yes | Yes | 2 |
| C8 | Yes | 10 | 12 | 1.5%KMnO$_4$, 1.5% K$_2$MoO$_4$, 1% NaNO$_3$ | 80 | 2 min | Yes | Yes | 7 |
| C8 | Yes | 10 | 13 | 1.5%KMnO$_4$, 1.5% K$_2$MoO$_4$, 1% NaNO$_3$ | 80 | 2 min | Yes | Yes | 18 |

| C9 | No  | 80 | 13.5 | EDTA | 25 | 2 min  | Yes | Yes | 15 |
| C9 | Yes | 25 | 13.5 | EDTA | 25 | 2 sec  | Yes | Yes | 18 |
| C9 | Yes | 25 | 13.5 | EDTA | 25 | 5 sec  | Yes | Yes | 5  |
| C9 | Yes | 25 | 13.5 | EDTA | 25 | 10 sec | Yes | Yes | 5  |
| C9 | Yes | 25 | 13.5 | EDTA | 25 | 1 min  | Yes | Yes | 8  |

Figure 3 – Ferrate Conversion Coatings

| Corresponding Example | Boehmite | Conversion Solution* | | Post-Sealants | | Corrosion Performance |
|---|---|---|---|---|---|---|
| | | Main Component (wt%) | Additives (wt%) | $Ca(OH)_2$ | Silicate | Salt Fog Results (days) |
| D1 | YES | no conversion step | | NO | NO | 1 |
| D2 | YES | 3% $Na_2MoO_4$ | NONE | NO | NO | 2 |
| D3 | YES | 1.5% $Na_2MoO_4$ | 1.5% $KMnO_4$ | NO | NO | 2 |
| D3 | YES | 1.5% $Na_2MoO_4$ | 1.5% $KMnO_4$ 0.5% LiCl 0.5% $LiNO_3$ | NO | NO | 3 |
| D4 | YES | 3% $Na_2MoO_4$ | NONE | YES | YES | 21 |
| D4 | YES | 3% $K_2MoO_4$ | NONE | YES | YES | 5 |
| D4 | YES | 3% $Li_2MoO_4$ | NONE | YES | YES | 3 |
| D5 | NO  | 1.5% $Na_2MoO_4$ | 1.5% $KMnO_4$ 0.5% LiCl 0.5% $LiNO_3$ | YES | YES | 3 |
| D5 | YES | 1.5% $Na_2MoO_4$ | 1.5% $KMnO_4$ | YES | YES | 18 |
| D5 | YES | 1.5% $Na_2MoO_4$ | 1.5% $KMnO_4$ 0.5% LiCl | YES | YES | 19 |
| D5 | YES | 1.5% $Na_2MoO_4$ | 1.5% $KMnO_4$ 0.5% $LiNO_3$ | YES | YES | 15 |
| D5 | YES | 1.5% $Na_2MoO_4$ | 1.5% $KMnO_4$ 0.5% LiCl 0.5% $LiNO_3$ | YES | YES | 20 |
| D5 | YES | 1.5% $Na_2MoO_4$ | 1.5% $KMnO_4$ 0.5% $LiCO_3$ | YES | YES | 2 |
| D5 | YES | 3% $Na_2MoO_4$ | 0.5% LiCl 0.5% $LiNO_3$ 1% $K_2ZrF_6$ 0.5% $K_2TiF_6$ | YES | YES | 14 |
| D5 | YES | 1.5% $Na_2MoO_4$ | 1.5% $KMnO_4$ 0.5% LiCl 0.5% $LiNO_3$ 1% $K_2ZrF_6$ 0.5% $K_2TiF_6$ | YES | YES | 7 |
| D5 | YES | 3% $Na_2MoO_4$ | 0.5% LiCl 0.5% $LiNO_3$ 0.5% $NaNO_3$ | YES | YES | 14 |

| | | | | | | |
|---|---|---|---|---|---|---|
| D5 | YES | 3% Na$_2$MoO$_4$ | 0.5% LiCl<br>0.5% LiNO$_3$<br>0.5% NH$_4$NO$_3$ | YES | YES | 2 |
| D5 | YES | 1.5% Na$_2$MoO$_4$ | 1.5% KMnO$_4$<br>0.5% LiCl<br>0.5% LiNO$_3$<br>0.5% Na$_2$SiF$_6$ | YES | YES | 2 |
| D5 | YES | 1.5% Na$_2$MoO$_4$ | 1.5% KMnO$_4$<br>0.5% LiCl<br>0.5% LiNO$_3$<br>0.5% K$_2$ZrF$_6$<br>0.5% Na$_3$PO$_4$ | YES | YES | 7 |
| D5 | YES | 1.5% Na$_2$MoO$_4$ | 1.5% KMnO$_4$<br>0.5% LiCl<br>0.5% LiNO$_3$<br>0.5% K$_2$ZrF$_6$<br>0.5% Na$_4$P$_2$O$_7$ | YES | YES | 7 |

*All conversion coatings were applied for 2 minutes at 80°C.

Figure 4 – Molybdate Conversion Coatings

CONVERSION COATINGS PREPARED OR TREATED WITH CALCIUM HYDROXIDE SOLUTIONS

This invention was made with Government support under contract NAS10-97003 awarded by NASA. The Government has certain rights in this invention.

BACKGROUND OF THE INVENTION

1. Field of the Invention

The present invention relates to a method and solution for forming or enhancing the properties, such as corrosion resistance, of a conversion coating on metal surfaces or substrates.

2. Background of the Related Art

In general, chemical conversion coatings are formed chemically by causing the surface of the metal to be "converted" into a tightly adherent coating, where either all or part of the conversion coating consists of an oxidized form of the substrate metal. Chemical conversion coatings can provide high corrosion resistance to the substrate as well as strong bonding affinity for paint. The industrial application of paint to metals generally requires the use of a chemical conversion coating, particularly when the performance demands are high.

Although aluminum protects itself against corrosion by forming a natural oxide coating, the protection is not complete. In the presence of moisture and electrolytes, aluminum alloys, particularly aluminum alloys with a high copper content, corrode much more rapidly than pure aluminum.

In general, there are two types of processes for treating aluminum to form a beneficial conversion coating. The first is by anodic oxidation (anodization) in which the aluminum component is immersed in a chemical bath, such as a chromic or sulfuric acid bath, and an electric current is passed through the aluminum component and the chemical bath. The conversion coating formed on the surface of the aluminum component offers resistance to corrosion and a bonding surface for organic finishes.

The second type of process is by chemically producing a conversion coating, which is commonly referred to as a chemical conversion coating, by subjecting the aluminum component to a chemical solution, such as a chromic acid solution, but without using an electric current in the process. The chemical solution may be applied by immersion application, by manual application, or by spray application. The resulting conversion coating on the surface of the aluminum component offers resistance to corrosion and a bonding surface for organic finishes.

Chromate based conversion coatings have been widely used in applications where maximum corrosion protection is an issue. Immersion of aluminum or aluminum alloys in a chromate conversion coating bath results in a thick, corrosion resistant film consisting of hydrated $Cr(III)$ and $Al(III)$ oxides. The reaction is driven by reduction of the high valent $Cr(VI)$ ion and oxidation of the Al metal. Some of the benefits of a chromate conversion coating include hydrophobicity and self-healing properties.

Many aluminum structural parts, as well as Cd plated, Zn plated, Zn—Ni plated, and steel parts, throughout the aircraft and aerospace industry are currently being treated using this chromic acid process technology. Chromic acid conversion films, as formed on aluminum substrates, have been shown to meet a 168-hour corrosion resistance criterion, but they primarily serve as a surface substrate for paint adhesion. Because of their relative thinness and low coating weights (40–150 milligrams/$ft^2$), chromic acid conversion coatings do not reduce the fatigue life of the aluminum structure.

However, environmental regulations in the United States, particularly in California, and in other countries are drastically reducing the levels of hexavalent chromium compounds permitted in effluents and emissions from metal finishing processes. Accordingly, chemical conversion coating processes employing hexavalent chromium compounds need to be replaced.

Some of the most investigated non-chromate conversion coatings used in the treatment of aluminum alloy-based materials are described as follows. Sol-Gel technology uses polymers or metal oxides either alone or mixed to form complexes by the hydrolysis of appropriate precursor compounds. Sol-Gels can form powders or thin films that inhibit corrosion on substrates.

Fluorozirconium coating technology uses complexed transition metal salts to create a thin film on a substrate material similar to a conversion coating. Specifically, zirconium is mixed with fluorine to create fluorozirconium, which reacts with the part surface to form a coating.

Cobalt-based coatings use cobalt and molybdenum to treat substrate materials. The coatings created are low in electrical resistance and are good for corrosion resistance.

Rare Earth Metal (REM) salts may be applied by heated immersion to create protective layers on substrate materials. REMs provide corrosion resistance by producing a protective oxide film.

Potassium permanganate solutions can be used to create manganese oxide films on substrates. Manganese oxide films resulting from potassium permanganate treatment closely match the corrosion resistance of traditional chromic oxide films used in conversion coatings. Potassium permanganate coatings can be very effective in protecting aluminum alloys.

Fluotitanic coatings, deposited from acid solutions with organic polymers, require few process steps, and can usually be done at ambient temperatures. Although these coatings have been widely used in a variety of applications, they have not been used in the aerospace industry.

Talc coatings, which are typically applied to aluminum substrates, are resistant to corrosion. These polycrystalline coatings are applied by precipitating aluminum-lithium compounds and other anions in an alkaline salt solution.

Anodizing is a process in which a metal surface is converted to an oxide layer, producing a tough, adherent surface layer. A thick oxide layer can be produced by immersing a part in an electrolytic solution and passing an electrical current through it, similar to electroplating. Then, by placing the part in boiling water, the film's pores can be sealed. As a result, the oxide changes from one form to another.

Despite these alternatives, there is a continuing need for a conversion coating solution that will form a stable, corrosion-resistant conversion coating on metal surfaces without containing or producing toxic chemicals. Additionally, it would be desirable if the conversion coating provided a suitable surface for receiving organic coatings or paints.

SUMMARY OF THE INVENTION

The present invention provides a method for treating a conversion coating on a metal surface, comprising controlling the concentration of carbon dioxide in an aqueous solution, then combining calcium hydroxide with the aqueous solution to form an aqueous calcium hydroxide solution, and then providing contact between the conversion coating and the aqueous calcium hydroxide solution. The step of controlling the concentration of carbon dioxide in the aqueous solution may comprise heating the aqueous solution, passing the aqueous solution through an electroosmotic pump, sparging the solution using and inert gas, or any other known technique. The aqueous calcium hydroxide solution thus formed may be applied to the conversion coating by submersing, spraying, brushing or combinations thereof. The aqueous solution may contain water from any source, including tap water, deionized water, distilled water, sterilized water and combinations thereof. The aqueous calcium hydroxide solution has a calcium hydroxide concentration up to saturation, preferably between about 0.015 and about 0.15% by weight, and more preferably between about 0.06 and about 0.09% by weight.

The calcium hydroxide solution may be used as a post-treatment on conversion coatings formed using any conversion coating solution, such as those having one or more oxidants selected from permanganates, molybdates, polyoxometalates, heteropolyoxometalates, ferrates, cerium compounds, alkaline solutions of lithium salts, zirconates, and combinations thereof. The preferred conditions for treating the conversion coating include contacting the conversion coating with the aqueous calcium hydroxide solution for between about 1 and about 20 minutes at a temperature between about 25 and about 100° C. Optionally, it may be desirable to control exposure of the aqueous calcium hydroxide solution to carbon dioxide, such as by providing an inert gas atmosphere over the aqueous calcium hydroxide solution.

Alternatively, the invention provides a method for treating a conversion coating, comprising obtaining an aqueous solution having a carbon dioxide concentration is below about 0.855 grams per liter and most preferably below about 0.454 grams per liter, then combining calcium hydroxide with the aqueous solution to form an aqueous calcium hydroxide solution; and then providing contact between the conversion coating and the aqueous calcium hydroxide solution.

The invention also provides a method for treating a metal surface, comprising controlling the concentration of carbon dioxide in an aqueous solution; then combining calcium hydroxide with the aqueous solution to form an aqueous calcium hydroxide solution; and then contacting the metal surface with the aqueous calcium hydroxide solution.

The method may be used to form a stable conversion coating on a metal substrate, comprising: forming a conversion coating using a conversion coating solution having one or more oxidants selected from permanganates, molybdates, polyoxometalates, heteropolyoxometalates, ferrates, cerium compounds, alkaline solutions of lithium salts, zirconates, and combinations thereof; and treating the conversion coating with an aqueous calcium hydroxide solution prepared by combining calcium hydroxide with an aqueous solution having less than 1.73 grams of carbon dioxide per liter. Preferably, the aqueous solution has a carbon dioxide concentration less than 0.85 grams per liter, and more preferably less than 0.45 grams per liter. The conversion coating may include, but is not limited to, a boehmite layer, preferably formed on the metal surface by anodization or boiling in water prior to use of the conversion coating solution.

The invention also provides a method for preparing a conversion coating solution, comprising controlling the concentration of carbon dioxide in an aqueous solution, then combining calcium hydroxide with the aqueous solution to form an aqueous calcium hydroxide solution. The step of controlling the concentration of carbon dioxide in the aqueous solution may comprises either heating the aqueous solution, such as to a temperature between 50 and 100° C., passing the aqueous solution through an electroosmotic pump, or sparging the solution using and inert gas.

BRIEF DESCRIPTION OF THE DRAWINGS

FIG. 1 is a table of solutions used in examples A1–A7 along with the results of corrosion tests for each of the examples.

FIG. 2 is a table of solutions used in examples B1–B6 along with the results of corrosion tests for each of the examples.

FIG. 3 is a table of solutions used in examples C1–C12 along with the results of corrosion tests for each of the examples.

FIG. 4 is a table of solutions used in examples D1–D5 along with the results of corrosion tests for each of the examples.

DETAILED DESCRIPTION OF THE INVENTION

The present invention provides a conversion coating solution and process that forms a stable and corrosion-resistant oxide layer on metal substrates or layers or on conversion coatings. Particularly, the conversion coating process involves contacting the substrate, layer or coating with an aqueous calcium hydroxide solution in order to convert the surface of the substrate, layer or coating to a stable conversion coating. According to the present invention, it is critical to avoid forming carbonates in the solution as the result of calcium hydroxide reacting with carbon dioxide. This critical objective is most preferably achieved by preparing the calcium hydroxide solution using water or an aqueous solution having a carbon dioxide concentration that is less than equilibrium amounts of carbon dioxide at ambient temperature. Accordingly, water or aqueous solutions that contain carbon dioxide must be processed to remove some, all or substantially all of the carbon dioxide in the water or aqueous solution before introducing the calcium hydroxide. In this manner, formation of calcium carbonate particles is avoided and the porosity of the conversion coating produced or treated by the calcium hydroxide solution is reduced to below about 1%.

The concentration of carbon dioxide in water may be reduced through any known process, but is preferably reduced by heating the water, most preferably to a temperature between about 50° C. and about 100° C. Other processes for reducing the carbon dioxide concentration in water include passing the water through an electroosmotic pump or passing the carbon dioxide through a hydrophobic membrane. It is important that the carbon dioxide content of the water be reduced, since the amount of carbon dioxide present in water at room temperature will yield a solution that does not produce the desired corrosion protection. While water exposed to air typically contains diffused carbon dioxide gas at a concentration of about 1.73 grams per liter of water, it is preferred to reduce the carbon dioxide concentration to below 0.85 g/L, and more preferably below 0.45 g/L.

The improved calcium hydroxide solutions, as well as processes for using the improved calcium hydroxide solution to form conversion coatings disclosed herein, may be used in at least two applications to form low porosity conversion coatings. First, the solutions and processes may be used on "bare" metal substrates or layers. "Bare" metal substrates, as that term is used herein, is intended to mean metal substrates or metal layers that have not been previously provided with a conversion coating layer, but that may contain certain amounts of oxides occurring by environmental conditions. As will become apparent from the present disclosure, "bare" metal may also include metal substrates or layers that have been cleaned, deoxidized, or otherwise treated to expose the metal in its unoxidized form.

Second, the calcium hydroxide solutions and processes of the present invention may be used as post treatments in association with other known conversion coatings and processes. In this manner, the calcium hydroxide solution is applied into contact with the metal oxide or conversion coating surfaces that have already been formed or induced on a metal substrate or layer. Conventional conversion coating processes include, but are not limited to, cerium compounds, alkaline solutions of lithium salts, manganates, molybdates, chromates, ferrates, polyoxometalates, heteropolyoxometalates, zirconates, boiling in water to form boehmite, electrochemical anodization, exposure to oxidizing gases, and the like. While applying calcium hydroxide solutions in this second manner has sometimes been referred to as a "post-treatment", the solutions and processes of the present invention may also be referred to as sealants or any other term so long as they enhance or modify properties of the existing oxide or conversion coating layers. Specifically, the calcium hydroxide solutions and processes have been found to enhance or modify the corrosion resistance and reduce the porosity of the resulting layer. The terms "metal", "metal substrate" and "metal layer" include, but are not limited to, individual metals and alloys or combinations of metals.

The calcium hydroxide concentration may be any concentration, preferably up to saturation, more preferably between about 0.015% and about 0.15% by weight, and most preferably between about 0.06 and about 0.15% by weight. The calcium hydroxide solutions are preferably used at a solution temperature between about ambient or room temperature (typically about 25° C.) and about the boiling point of the aqueous solution (typically about 100° C.). The contact time between the calcium hydroxide solution and the substrate may be of any effective duration, but is preferably between about 1 and about 20 minutes. The calcium hydroxide solution may further comprise up to about 5% by weight of a sealant selected from an alkali metal silicate, an alkali metal borate, an alkali metal phosphate, or lithium nitrate. Optionally, the aqueous calcium hydroxide solution may further include manganese, molybdenum or a combination thereof that form stable coatings that act as inhibitors to corrosion of the coatings.

The solutions and processes of the present invention may be used in association with metal substrates selected from aluminum, aluminum alloys, steels (e.g., carbon steels and stainless steels), and other ferrous metals. Where the terms "aluminum" and "aluminum alloys" are used herein, they should be interpreted to be inclusive of each other, i.e. "aluminum" does not exclude aluminum alloys, unless the description specifically states otherwise.

Optionally, yet preferably, the metallic surface of the substrate is pre-treated before being contacted with a conversion coating solution such as the calcium hydroxide solution. Most preferably, the metal surface is cleaned by sonicating in acetone for 30 minutes, then cleaned in an alkaline solution. The cleaned metal surface may then be immersed in a deoxidizing solution such as LNC deoxidizer (Oakite Products Inc., Berkeley Heights, N.J.) to remove any residual oxide film from the metal surface. If the metal is aluminum, the cleaned surface may then be exposed to boiling water or anodization to form an oxide layer.

It is also optional to carry out the process of contacting a substrate with the calcium hydroxide solutions disclosed herein while maintaining an inert atmosphere or environment, or perhaps a vacuum, around the process to avoid carbon dioxide from the air being absorbed into the solution and/or reacted with the calcium hydroxide. Any inert gas known in the art may be used for this purpose, particularly including argon or nitrogen. Other methods of excluding or reducing carbon dioxide exposure may also be used. It is also anticipated that an inert atmosphere or vacuum may be maintained over a calcium hydroxide solution between preparation and application to a substrate, whether the period of storage is a few minutes or more than a day.

EXAMPLES

Alkali metal permanganate solutions suitable for use in preparing conversion coatings are described by Bibber in U.S. Pat. No. 4,878,963, which is incorporated by reference herein. Pentavalent vanadium solutions suitable for use in preparing conversion coatings are described by Cape in U.S. Pat. No. 4,828,615, which is incorporated by reference herein. Acidic zirconium solutions suitable for use in preparing conversion coatings are described by Tomlinson in U.S. Pat. No. 5,759,244, which is incorporated by reference herein. Cerium salt solutions suitable for use in preparing conversion coatings are described by Kindler in U.S. Pat. No. 5,192,374, which is incorporated by reference herein. Acidic permanganate and cerous chloride solutions suitable for use in preparing conversion coatings are described by Miller in U.S. Pat. No. 5,419,790, which is incorporated by reference herein. Alkaline cobalt solutions suitable for use in preparing conversion coatings are described by Schriever in U.S. Pat. No. 5,551,994, which is incorporated by reference herein.

The following examples of the present invention show the function of the invention and disclose some of its preferred embodiments. These examples are not to be taken as limiting the scope of the invention to the steps described therein, as the invention may include other steps and conditions. Except where indicated, aluminum panels measuring 1.5 inches by 2 inches were used in the following examples, and all amounts are percentages by weight.

CALCIUM HYDROXIDE

Example A1

Preparation of Aluminum or Aluminum Alloy Panels

Except where indicated, aluminum or aluminum alloy panels were used in the following examples. Prior to contacting the panels with a coating solution, the panels were prepared by sonication in acetone for 30 minutes. They were then cleaned with an alkaline cleaning solution (4215 NCLT available from Elf Atochem—Turco Products Division, Westminster, Calif.) for 10 minutes at 50° C. to 60° C. The panels were then rinsed with deionized water and immersed in a deoxidizing solution of 15% LNC deoxidizer (Oakite Products, Inc., Berkeley Heights, N.J.) for 10 minutes at room temperature. Optionally, the cleaned panels could then be exposed to boiling water or anodization to form an oxide layer (boehmite). The panels were then thoroughly rinsed with deionized water and allowed to dry.

Example A2

This Example Describes the Application of the Treatment Solution of the Present Invention onto the Uncoated Aluminum Surfaces Described in Example 1

An aqueous solution containing alkali metal nitrates (0.1–5% by weight) was brought to the desired temperature (50–100° C.). Immediately prior to the immersion of the aluminum alloy panels prepared as described in Example A1, desired amounts of $Ca(OH)_2$ (0.015%–0.15%) were dissolved in this solution. The metal surfaces were treated for 1–20 minutes, and then washed thoroughly with deionized water, dried in air for 48 to 96 hours, and tested by salt fog spray according to the ASTM B-117 test method.

Example A3

This Example Describes the Application of High Valent Transition Metal Oxyanions (Conversion Coatings) onto Aluminum Surfaces Coated with Boehmite Aluminum panels were prepared as described in Example A1. These panels were then treated in solutions containing transition metal oxyanions (0.01%–3%) including but not limited to alkali metal permanganate, molybdate, heteropolymetalates, isopolymetalates, and ferrates, with or without compounds containing fluoride, silicate, nitrate, phosphate, and borate anions. The concentrations of these anions can be varied between 0.1–3%. The metal surfaces were coated at temperatures 25–80° C. for 1 second to 5 minutes. The metal surfaces were then washed thoroughly with deionized water, dried in air for 48 to 96 hours, and tested by salt fog spray according to the ASTM B-117 test method.

Example A4

This Example Describes the Application of the Treatment Solution of the Present Invention onto Aluminum Surfaces Coated with Boehmite and High Valent Transition Metal Oxyanions (Conversion Coatings)

Aluminum panels were prepared with transition metal oxyanions as described in Example A3. The aqueous solution containing alkali metal nitrates (0.1–5% by weight) was brought to the desired temperature (50–100° C.). Immediately prior to the immersion of the coated aluminum alloy panels, desired amounts of solid $Ca(OH)_2$ (0.015%–0.15%) were dissolved in this solution. The metal surfaces were then treated for 1–20 minutes, washed thoroughly with deionized water, dried in air for 48 to 96 hours, and tested by salt fog spray according to the ASTM B-117 test method.

Example A5

This Example Describes the Application of the Aged $Ca(OH)_2$ Solutions onto the Aluminum Surfaces Coated with Boehmite and/or Transition Metal Oxyanions Aluminum panels were prepared as in Examples 1 and 3. Saturated calcium hydroxide solution with the desired nitrate content (0.15% $Ca(OH)_2$, 1% $LiNO_3$) was prepared and diluted when necessary. Calcium hydroxide solution of the desired concentration (preferably 0.015%–0.15%) was prepared from dilution of the aged, saturated solution, and heated to the desired temperatures (50–100° C.). The coated panels were treated with this solution for 1–20 minutes and rinsed thoroughly with deionized water. The panels were washed thoroughly with water, dried in air for 48 to 96 hours, and tested by salt fog spray according to the ASTM B-117 test method. Samples prepared in this fashion showed extensive pits in the salt fog chamber in less than 96 hours.

Example A6

This Example Describes the Application of the Ca $(OH)_2$ Solutions without Alkali Metal Nitrates onto the Aluminum Surfaces Coated with Boehmite and/or Transition Metal Oxyanion Solutions Aluminum panels were prepared as in Examples 1 and 3. A deionized water solution without alkali metal nitrates, was heated to the desired temperature range, and immediately prior to the immersion of aluminum panels, an appropriate amount of solid $Ca(OH)_2$ was added. The panels were treated with this solution at 50–100° C. for 1–20 minutes and rinsed thoroughly with water. The panels were then dried in air at room temperature for 48 to 96 hours, and tested by salt fog spray according to the ASTM B-117 test method. The samples prepared in this fashion showed extensive pits in the salt fog chamber in less than 96 hours.

Example A7

This Example Describes the Application of Other Hydroxide Solutions Containing Alkali Metal Nitrates onto the Aluminum Surfaces Coated with Boehmite and/or Transition Metal Oxyanion Solutions Aluminum panels were prepared as in Examples 1 and 3. Aqueous solutions containing LiOH (0.1–2%) or NaOH (0.1–2%), and including $LiNO_3$ (0.1–1%) were prepared and heated to the desired temperatures (50–100° C.). The panels were then treated with these solutions for 1–20 minutes and rinsed thoroughly with water. The panels were then washed thoroughly with water, dried in air at room temperature for 48 to 96 hours, and tested by salt fog spray according to the ASTM B-117 test method. The samples prepared in this fashion failed in the salt fog chamber in less than 48 hours.

The compositions of the solutions used in the foregoing examples are present in FIG. 1 along with the results of corrosion tests for each of the examples.

HETEROPOLYMETALATE-CONTAINING CONVERSION COATING SOLUTIONS

Heteropolymetalate-containing conversion coating solutions and methods of using heteropolymetalate solutions is described in U.S. patent application Ser. No. 09/464,284 filed on Dec. 15, 1999, which is incorporated herein by reference. Collectively, the following examples illustrate the corrosion resistance of conversion coatings made with heteropolymetalates and with/without a post-treatment with calcium hydroxide solutions of the present invention.

Example B1

This example describes the pre-treatment of the aluminum panels. Prior to contacting the aluminum panels with an aqueous chemical conversion coating solution, the panels were degreased and prepared by sonication in acetone for 30 minutes. They were then cleaned with an alkaline cleaning solution (such as 4215 NCLT available from Elf Atochem—Turco Products Division, Westminister, Calif.), for 10 minutes at 60° C. The panels were then rinsed with deionized water and treated with a deoxidizing solution of 15% LNC deoxidizer (Oakite Products Inc., Berkeley Heights, N.J.) for 10 minutes at 25° C. The panels were then immersed in boiling water for 20 minutes and coated with a thin layer of boehmite of a general formula $AlO_x(OH)_y$.

Example B2

This example describes the treatment of the aluminum panels with an aqueous chemical conversion coating solution containing only polymetalate or heteropolymetalate compounds. Aqueous chemical conversion coating solutions of polymetalate or heteropolymetalates having concentrations between about 1.0% and 5.0% were prepared, and the aluminum panels pre-treated as described in Example B1 were immersed in the solution for 2 to 5 minutes at different temperatures ranging from 25° C. to 80° C. The panels were then rinsed thoroughly with deionized water, dried in air for 48 hours and tested by exposure in a salt-fog chamber according to ASTM Method B-117.

Example B3

This example describes the treatment of the aluminum panels with conversion coating solutions containing polymetalate or heteropolymetalate compounds in a combination of one or more compounds such as phosphates, borates, silicates, fluorides or metal oxides. Aqueous solutions of polymetalates or heteropolymetalates having concentrations in the range from 1.0% to 5.0% and one or more additives with concentrations from 0.1% to 3.0% were prepared. The aluminum panels prepared as described in Example B1 were immersed in these solutions for 2 to 5 minutes at different temperatures from 25° C. to 80° C. The panels were then rinsed thoroughly with deionized water, dried in air for 48 hours and tested by exposure to a salt-fog chamber in accordance with ASTM Method B-117.

Example B4

This example describes the formation of reduced heteropolymolybdates on the substrate surfaces and self-oxidation in air. The panels pre-treated as described in Example B1 were immersed in a conversion coating solution consisting of from 1.0% to 5.0% heteropolymolybdates and from 0.1% to 3.0% fluoride containing species. The panels were left to contact with the conversion coating solution for 2 minutes at temperatures between 60° C. and 80° C. The yellow coating solution (a characteristic color for most of the heteropolymolybdates) turned dark green after 2 minutes and the substrate surfaces were coated with dark films.

It was repeatedly observed that the dark coatings obtained from the treatments of Al 2024-T3 panels with conversion solutions of $H_3PMo_{12}O_{40}$ and $Na_2SiF_6$, became lighter when dried in air for extended periods of time. This was suggestive of the formation of the reduced heteropolymolybdate species during the conversion process and slow reoxidation during the final drying process in air. In order to test this hypothesis, heteropolymolybdate coatings were prepared and handled in an argon atmosphere. This led to the preservation of the coating color. XPS spectra of such a coating was compared with pure heteropolymolybdate compound ($H_3PMo_{12}O_{40}$) as well as with XPS spectra of the same coating dried for 10 days in air. It could be seen that the air dried heteropolymolybdate coating had a set of Mo 3d peaks with a 3d5/2 binding energy at 232.4 eV, which agrees well with that of the pure $H_3PMo_{12}O_{40}$ (232.9 eV) and is consistent with the presence of six valent molybdenum species. On the other hand, Mo3d XPS spectrum of the argon-dried coatings appeared to be complicated. XPS spectrum revealed at least two sets of Mo 3d peaks at 231.6 eV and 228.1 eV that are suggestive of reduced molybdenum species. These results suggest that reduced heteropolymolybdates are formed during the conversion process and self oxidize in air, forming six valent species that can be further utilized for self-healing of the aluminum surface.

The panels were then rinsed thoroughly with deionized water. During this step, a solution having a blue color (a characteristic color for the reduced heteropolymolybdates) was rinsed off the substrate surfaces. A set of the panels were air dried in a chamber under flowing helium for 12 hours. The dark coating on the panels that was left in air changed to a very light brown color in a few hours. By contrast, when the panels were dried in an inert atmosphere, the dark coating was retained. However, when these dark coatings were exposed to air after 12 hours, the dark color faded away in a few hours due to the oxidation of the reduced heteropolymolybdates.

Example B5

This example describes the post-treatment of the coated substrates to enhance and preserve performance of the chemical conversion coating. An aqueous solution of polymetalates or heteropolymetalates having concentrations in the range from 1.0% to 5.0% by weight. The substrate panels prepared as described in Example B1 were immersed in the prepared solutions for two minutes at different temperatures from 50° C. to 80° C. The panels were rinsed thoroughly with deionized water and then received post-treatment by being immersed, first in an aqueous solution containing 0.09% by weight calcium hydroxide and, 0.6% by weight lithium nitrate at 100° C. for 20 minutes, and second in an aqueous solution containing 2.4% by weight alkali metal silicate at 80° C. for 5 minutes. They were finally dried in air for 48 hours and tested by exposure to a salt-fog chamber in accordance with ASTM Method B-117.

Example B6

This example describes the post-treatment of the coated substrates to enhance and preserve performance of the chemical conversion coating. An aqueous solution of polymetalates or heteropolymetalates having concentrations in the range from 1.0% to 5.0% by weight and one or more additives with concentrations of 0.1% to 3.0% were prepared. The substrate panels prepared as described in Example B1 were immersed in the prepared solutions for two minutes at different temperatures from 50° C. to 80° C. The panels were rinsed thoroughly with deionized water and then received post-treatment by being immersed, first in an aqueous solution containing 0.09% by weight calcium hydroxide and 0.6% by weight lithium nitrate at 100° C. for 20 minutes, and second in an aqueous solution containing 2.4% by weight alkali metal silicate at 80° C. for 5 minutes. They were finally dried in air for 48 hours and tested by exposure to a salt-fog chamber in accordance with ASTM Method B-117.

The compositions of the solutions used in the foregoing examples are present in FIG. 2 along with the results of corrosion tests for each of the examples.

FERRATE-CONTAINING CONVERSION COATING SOLUTIONS

Ferrate-containing conversion coating solutions and methods of using ferrate solutions is described in U.S. patent application Ser. No. 09/461,944 filed on Dec. 15, 1999 which is incorporated herein by reference. Collectively, the following examples illustrate the corrosion resistance of conversion coatings made with ferrates and with/without a post-treatment with calcium hydroxide solutions of the present invention.

Example C1

Preparation of Aluminum or Aluminum Alloy Panels

Except where indicated, aluminum or aluminum alloy panels were used in the following examples. Prior to contacting the panels with a coating solution, the panels were prepared by sonication in acetone for 30 minutes. They were then cleaned with an alkaline cleaning solution (such as 4215 NCLT available from Elf Atochem—Turco Products Division, Westminster, Calif.) for 10 minutes at 50° C. to 60° C. The panels were then rinsed with deionized water and immersed in a deoxidizing solution of 15% LNC deoxidizer (Oakite Products, Inc., Berkeley Heights, N.J.) for 10 minutes at room temperature. Optionally, the cleaned panels could then be exposed to boiling water or anodization to form an oxide layer. The panels were then thoroughly rinsed with deionized water and allowed to dry.

Example C2

Aluminum or Aluminum Alloy Panels Treated with Conversion Coating Solutions Containing only Ferrate(VI)

Aqueous solutions of ferrate(VI) having concentrations between 0.0166% (1 mM) to 1.66% (100 mM) ferrate(VI) were prepared. Aluminum panels, prepared as described in Example C1, were immersed in each of the solutions for a period between 1 second and 5 minutes at a temperature between 25° C. and 80° C. The panels were then rinsed thoroughly with deionized water, dried in air for 48 to 94 hours, and tested by salt fog spray according to the ASTM B-117 test method (samples were placed at 15° angle).

Example C3

Aluminum or Aluminum Alloy Panels Treated with Conversion Coating Solutions Containing Ferrate (VI) in Combination with One or More Oxyanions or Salts Aqueous solutions of ferrate(VI) having concentrations between 0.0166% (1 mM) and 1.66% (100 mM) ferrate(VI), with or without 0.5% sodium nitrate, 1.0% to 3.0% of one or more of potassium permanganate and potassium molybdate, and 0.5% to 1.0% of one or more of lithium chloride or lithium nitrate were prepared. The aluminum panels prepared as described in Example C1 were immersed in this conversion coating solution for between 1 second and 5 minutes at temperatures between 25° C. and 80° C. The panels were then rinsed thoroughly with deionized water, dried in air for 48 to 94 hours, and tested by salt fog spray according to ASTM B-117 test method (samples were placed at 15° angle).

Example C4

Aluminum or Aluminum Alloy Panels Treated with Conversion Coating Solutions Containing Ferrate (VI) and EDTA at Low Hydroxide Concentrations Aqueous solutions of ferrate(VI) with EDTA having concentrations between 0.0166% to 1.66% ferrate(VI) at a pH between 13 and 13.5 were prepared. Aluminum or aluminum alloy panels prepared as described in Example C1, were immersed in this conversion coating solution for between 1 second to 10 minutes at temperatures between 25° C. to 80° C. The panels were then rinsed thoroughly with deionized water, dried in air for 48 to 94 hours, and tested by salt fog spray according to the ASTM B-117 test method (samples were placed at 15° angle).

Example C5

Aluminum or Aluminum Alloy Panels Treated with Conversion Coating Solutions Containing Ferrate (VI) and EDTA at Low Hydroxide Concentrations in Combination with One or More Oxyanions or Salts Aqueous solutions of ferrate(VI) with EDTA having concentrations between 0.0166% to 1.66% ferrate(VI) at a pH between 13 and 13.5 were prepared. The solutions could also contained 1.0% to 3.0% of one or more of potassium permanganate and potassium molybdate, and 0.5% to 1.0% of one or more of lithium chloride, lithium nitrate, or sodium nitrate. Aluminum panels prepared as described in Example C1, were immersed in this conversion coating solution for between 1 second and 10 minutes at temperatures between 25° C. and 80° C. The panels were then rinsed thoroughly with deionized water, dried in air for 48 to 94 hours, and tested by salt fog spray according to the ASTM B-117 test method (samples were placed at 15° angle).

Example C6

Aluminum or Aluminum Alloy Panels Treated with Multiple Exposures to Conversion Coating Solutions Containing Ferrate(VI)

Aluminum or aluminum alloy panels prepared as described in Example C1, were immersed in the conversion coating solutions as described in Examples C2 to C5 for 1 second to 1 minute at temperatures between 25° C. and 80° C. After exposure to one such conversion coating solution, the aluminum panels were removed and immersed in a fresh conversion coating solution for the same time period. This process was repeated between two and six times. The panels were then rinsed thoroughly with deionized water, dried in air for 48 to 94 hours, and tested by salt fog spray according to the ASTM B-117 test method (samples were placed at 15° angle).

Example C7

Aluminum or Aluminum Alloy Panels Treated with Conversion Coating Solutions Containing only Ferrate(VI) and then Treated with Post-sealants Aqueous solutions of ferrate(VI) having concentrations ranging between 0.0166% to 1.66% ferrate(VI) were prepared. Aluminum panels, prepared as described in Example C1, were immersed in each of the solutions for periods ranging from 1 second to 5 minutes at a temperature ranging between 25° C. and 80° C. The treated aluminum panels then received post-treatment by being immersed, first in an aqueous solution containing 0.09% by weight calcium hydroxide and 0.6% by weight lithium nitrate at 100° C. for 20 minutes, and second in an aqueous solution containing 2.4% by weight alkali metal silicate at 80° C. for 2 minutes. The panels were then rinsed thoroughly with deionized water, dried in air for 48 to 94 hours, and tested by salt fog spray according to the ASTM B-117 test method (samples were placed at 15° angle).

Example C8

Aluminum or Aluminum Alloy Panels Treated with Conversion Coating Solutions Containing Ferrate (VI) in Combination with One or More Oxyanions or Salts and then Treated with Post-sealants

Aqueous solutions of ferrate(VI) having concentrations between 0.0166% and 1.66% ferrate(VI), with or without 0.5% sodium nitrate, 1.0% to 3.0% of one or more of potassium permanganate and potassium molybdate, and 0.5% to 1.0% of one or more of lithium chloride or lithium nitrate were prepared. The aluminum panels prepared as described in Example 1 were immersed in this conversion coating solution for between 1 seconds and 5 minutes at temperatures between 25° C. and 80° C. The treated aluminum panels then received post-treatment by being immersed, first in an aqueous solution containing 0.09% by weight calcium hydroxide and 0.6% by weight lithium nitrate at 100° C. for 20 minutes, and second in an aqueous solution containing 2.4% by weight alkali metal silicate at 80° C. for 2 minutes. The panels were then rinsed thoroughly with deionized water, dried in air for 48 to 94 hours, and tested by salt fog spray according to ASTM B-117 test method (samples were placed at 15° angle).

Example C9

Aluminum or Aluminum Alloy Panels Treated with Conversion Coating Solutions Containing Ferrate (VI) and EDTA at Low Hydroxide Concentrations and then Treated with Post-sealants

Aqueous solutions of ferrate(VI) with EDTA having concentrations between 0.0166% to 1.66% ferrate(VI) at a pH between 13 and 13.5 were prepared. Aluminum panels prepared as described in Example C1, were immersed in this conversion coating solution for between 1 second to 10 minutes at temperatures between 25° C. to 80° C. The treated aluminum panels then received post-treatment by being immersed, first in an aqueous solution containing 0.09% by weight calcium hydroxide and 0.6% by weight lithium nitrate at 100° C. for 20 minutes, and second in an aqueous solution containing 2.4% by weight alkali metal silicate at 80° C. for 2 minutes. The panels were then rinsed thoroughly with deionized water, dried in air for 48 to 94 hours, and tested by salt fog spray according to the ASTM B-117 test method (samples were placed at 15° angle).

Example C10

Aluminum or Aluminum Alloy Panels Treated with Conversion Coating Solutions Containing Ferrate (VI) and EDTA at Low Hydroxide Concentrations in Combination with One or More Oxyanions or Salts and then Treated with Post-sealants

Aqueous solutions of ferrate(VI) with EDTA having concentrations between 0.0166% to 1.66% ferrate(VI) at a pH between 13 and 13.5 were prepared. The solutions also contained 1.0% to 3.0% of one or more of potassium permanganate and potassium molybdate, and 0.5% to 1.0% of one or more of lithium chloride, lithium nitrate, or sodium nitrate. Aluminum panels prepared as described in Example C1, were immersed in this conversion coating solution for between 1 seconds and 10 minutes at temperatures between 25° C. and 80° C. The treated aluminum panels were then immersed in one or more post-treatment solutions, such as alkali metal silicate and calcium hydroxide, between 80° C. to 100° C. for 1 minute to 20 minutes. The panels were then rinsed thoroughly with deionized water, dried in air for 48 to 94 hours, and tested by salt fog spray according to the ASTM B-117 test method (samples were placed at 15° angle).

Example C11

Aluminum or Aluminum Alloy Panels Treated with Multiple Exposures to Conversion Coating Solutions Containing Ferrate(VI) and then Treated with Post-sealants

Aluminum panels prepared as described in Example C1, were immersed in the conversion coating solutions as described in Examples C2 to C5 for 1 second to 1 minute at temperatures between 25° C. and 80° C. After exposure to one such conversion coating solution, the aluminum panels were removed and immersed in a fresh conversion coating solution for the same time period. This process was repeated between two and six times. The treated aluminum panels were then immersed in one or more post-treatment solutions, such as alkali metal silicate and calcium hydroxide, between 80° C. to 100° C. for 1 minute to 20 minutes. The panels were then rinsed thoroughly with deionized water, dried in air for 48 to 94 hours, and tested by salt fog spray according to the ASTM B-117 test method (samples were placed at 15° angle).

Example C12

Stabilization of Ferrate(VI) in the Conversion Coating Solution

The ferrate(VI) anions in the conversion coating solution may be stabilized by the addition of oxidizers such as peroxides, hypochlorites, ozone, or other oxidizers. The concentrations of these oxidizers can be varied between 0.1% and 0.5% by weight.

The compositions of the solutions used in the foregoing examples are present in FIG. 3 along with the results of corrosion tests for each of the examples.

MOLYBDATE-CONTAINING CONVERSION COATING SOLUTIONS

Example D1

This example describes the pre-treatment of the aluminum panels. Prior to contacting the aluminum panels with an aqueous chemical conversion coating solution, the panels were degreased and prepared by sonication in acetone for 30 minutes. They were then cleaned with an alkaline cleaning solution (such as 4215 NCLT available from Elf Atochem—Turco Products Division, Westminister, Calif.), for 10 minutes at 60° C. The panels were then rinsed with deionized water and treated with a deoxidizing solution of 15% LNC deoxidizer (Oakite Products Inc., Berkeley Heights, N.J.) for 10 minutes at 25° C. The panels were then immersed in boiling water for 20 minutes and coated with a thin layer of boehmite of a general formula $AlO_x(OH)_y$.

Example D2

This example describes the treatment of the aluminum panels with an aqueous chemical conversion coating solution containing only molybdate compounds. Aqueous chemical conversion coating solutions of molybdate having concentrations between about 1.0% and 5.0% were prepared, and the aluminum panels pre-treated as described in Example D1 were immersed in the solution for 2 to 5 minutes at different temperatures ranging from 25° C. to 80° C. The panels were then rinsed thoroughly with deionized water, dried in air for 48 hours and tested by exposure in a salt-fog chamber according to ASTM Method B-117.

Example D3

This example describes the treatment of the aluminum panels with conversion coating solutions containing molybdate compounds in a combination of one or more compounds such as phosphates, borates, silicates, fluorides or metal oxides. Aqueous solutions of molybdate having concentrations in the range from 1.0% to 5.0% and one or more additives with concentrations from 0.1% to 3.0% were prepared. The aluminum panels prepared as described in Example D1 were immersed in these solutions for 2 to 5 minutes at different temperatures from 25° C. to 80° C. The panels were then rinsed thoroughly with deionized water, dried in air for 48 hours and tested by exposure to a salt-fog chamber in accordance with ASTM Method B-117.

Example D4

This example describes the post-treatment of the coated substrates to enhance and preserve performance of the chemical conversion coating. An aqueous solution of molybdate having concentrations in the range from 1.0% to 5.0% by weight. The substrate panels prepared as described in Example D1 were immersed in the prepared solutions for two minutes at different temperatures from 50° C. to 80° C. The panels were rinsed thoroughly with deionized water and then received post-treatment by being immersed, first in an aqueous solution containing 0.09% by weight calcium hydroxide and 0.6% by weight lithium nitrate at 100° C. for 20 minutes, and second in an aqueous solution containing 2.4% by weight alkali metal silicate at 80° C. for 5 minutes. They were finally dried in air for 48 hours and tested by exposure to a salt-fog chamber in accordance with ASTM Method B-117.

Example D5

This example describes the post-treatment of the coated substrates to enhance and preserve performance of the chemical conversion coating. An aqueous solution of molybdate having concentrations in the range from 1.0% to 5.0% by weight and one or more additives with concentrations of 0.1% to 3.0% were prepared. The substrate panels prepared as described in Example D1 were immersed in the prepared solutions for two minutes at different temperatures from 50° C. to 80° C. The panels were rinsed thoroughly with deionized water and then received post-treatment by being immersed, first in an aqueous solution containing 0.09% by weight calcium hydroxide and 0.6% by weight lithium nitrate at 100° C. for 20 minutes, and second in an aqueous solution containing 2.4% by weight alkali metal silicate at 80° C. for 5 minutes. They were finally dried in air for 48 hours and tested by exposure to a salt-fog chamber in accordance with ASTM Method B-117.

The compositions of the solutions used in the foregoing examples are present in FIG. 4 along with the results of corrosion tests for each of the examples.

As used herein, the singular form of a term shall be taken to include the plural form of the term, unless specifically stated otherwise. For example, terms such as "a", "an" and "the" used in association with a component of the invention shall be taken to mean "one or more" unless it is specifically stated that there should be only one component.

While the foregoing is directed to the preferred embodiment of the present invention, other and further embodiments of the invention may be devised without departing from the basic scope thereof, and the scope thereof is determined by the claims which follow.

We claim:

1. A method for treating a conversion coating on a metal surface, comprising:
   controlling the concentration of carbon dioxide in an aqueous solution; then
   combining calcium hydroxide with the aqueous solution to form an aqueous calcium hydroxide solution; and then
   providing contact between the conversion coating and the aqueous calcium hydroxide solution.

2. The method of claim 1, wherein the step of controlling the concentration of carbon dioxide in the aqueous solution comprises heating the aqueous solution.

3. The method of claim 2, wherein the aqueous solution is heated to a temperature between 50 and 100° C.

4. The method of claim 1, wherein the step of controlling the concentration of carbon dioxide in the aqueous solution comprises passing the aqueous solution through an electroosmotic pump.

5. The method of claim 1, wherein the step of controlling the concentration of carbon dioxide in the aqueous solution comprises sparging the solution using an inert gas.

6. The method of claim 1, wherein the aqueous calcium hydroxide solution has a pH between about 10 and about 14.

7. The method of claim 1, wherein the step of providing contact between the conversion coating and the aqueous calcium hydroxide solution comprises a process selected from submersing, spraying, brushing or combinations thereof.

8. The method of claim 1, wherein the conversion coating comprises an oxide of a metal selected from aluminum, aluminum alloys, copper, iron, and combinations thereof.

9. The method of claim 1, wherein the conversion coating comprises boehmite.

10. The method of claim 1, wherein the aqueous solution comprises water and one or more compounds selected from alkali metal silicates, alkali metal borates, alkali metal phosphates, alkali metal nitrates and mixtures thereof.

11. The method of claim 10, wherein the concentration of the one or more compounds is between about 0.015 and about 5% by weight.

12. The method of claim 10, wherein the aqueous solution comprises water selected from tap water, deionized water, distilled water, sterilized water and combinations thereof.

13. The method of claim 1, wherein the aqueous calcium hydroxide solution has a calcium hydroxide concentration up to saturation.

14. The method of claim 1, wherein the aqueous calcium hydroxide solution has a calcium hydroxide concentration between about 0.015 and about 0.15% by weight.

15. The method of claim 1, wherein the aqueous calcium hydroxide solution has a calcium hydroxide concentration between about 0.06 and about 0.09% by weight.

16. The method of claim 1, wherein the aqueous calcium hydroxide solution has a temperature between about 25 and about 100° C. at the time of providing contact between the conversion coating and the aqueous calcium hydroxide solution.

17. The method of claim 1, wherein the conversion coating is contacted with the aqueous calcium hydroxide solution for between about 1 and about 20 minutes.

18. The method of claim 1, wherein at least a portion of the conversion coating was formed using a conversion coating solution having one or more oxidants selected from permanganates, molybdates, polyoxometalates, heteropolyoxometalates, ferrates, cerium compounds, alkaline solutions of lithium salts, zirconates, and combinations thereof.

19. The method of claim 1, further comprising:
controlling exposure of the aqueous calcium hydroxide solution to carbon dioxide.

20. The method of claim 19, wherein the step of controlling exposure further comprises providing an inert gas atmosphere over the aqueous calcium hydroxide solution.

21. The method of claim 1, wherein the step of controlling the concentration of carbon dioxide in an aqueous solution comprises reducing the concentration of carbon dioxide in the aqueous solution.

22. A method for treating a conversion coating, comprising:
obtaining an aqueous solution having a carbon dioxide concentration below about 0.855 g/L; then
combining calcium hydroxide with the aqueous solution to form an aqueous calcium hydroxide solution; and then
providing contact between the conversion coating and the aqueous calcium hydroxide solution.

23. A method for treating a metal surface, comprising:
controlling the concentration of carbon dioxide in an aqueous solution; then
introducing calcium hydroxide into the aqueous solution to form an aqueous calcium hydroxide solution; and then
contacting the metal surface with the aqueous calcium hydroxide solution.

24. A method for treating a metal surface, comprising:
heating the aqueous solution to control the concentration of carbon dioxide in an aqueous solution; then
combining calcium hydroxide with the aqueous solution to form an aqueous calcium hydroxide solution; and then
contacting the metal surface with the aqueous calcium hydroxide solution.

25. The method of claim 24, wherein the aqueous solution is heated to a temperature between 50 and 100° C.

26. A method for treating a metal surface, comprising:
passing the aqueous solution through an electroosmotic pump to control the concentration of carbon dioxide in an aqueous solution; then
combining calcium hydroxide with the aqueous solution to form an aqueous calcium hydroxide solution; and then
contacting the metal surface with the aqueous calcium hydroxide solution.

27. A method for treating a metal surface, comprising:
exposing the aqueous solution to a vacuum environment to control the concentration of carbon dioxide in an aqueous solution; then
combining calcium hydroxide with the aqueous solution to form an aqueous calcium hydroxide solution; and then
contacting the metal surface with the aqueous calcium hydroxide solution.

28. The method of claim 23, wherein the aqueous calcium hydroxide solution has a pH between about 10 and about 14.

29. The method of claim 23, wherein the step of providing contact between the metal surface and the aqueous calcium hydroxide solution comprises a process selected from submersing, spraying, brushing or combinations thereof.

30. The method of claim 23, wherein the metal surface comprises a metal selected from aluminum, aluminum alloys, and ferrous metals.

31. A method for treating a ferrous metal surface, comprising:
controlling the concentration of carbon dioxide in an aqueous solution; then
combining calcium hydroxide with the aqueous solution to form an aqueous calcium hydroxide solution; and then
contacting the ferrous metal surface with the aqueous calcium hydroxide solution.

32. The method of claim 23, wherein the aqueous calcium hydroxide solution has a calcium hydroxide concentration up to saturation.

33. The method of claim 23, wherein the aqueous calcium hydroxide solution has a calcium hydroxide concentration between about 0.06 and about 0.09% by weight.

34. The method of claim 23, wherein the aqueous calcium hydroxide solution has a temperature between about 25 and about 100° C. at the time of contacting the metal surface with the aqueous calcium hydroxide solution.

35. The method of claim 23, wherein the conversion coating is contacted with the aqueous calcium hydroxide solution for between about 1 and about 20 minutes.

36. The method of claim 23, further comprising:
cleaning the metal surface prior to providing contact between the metal surface and the aqueous calcium hydroxide solution.

37. A method for treating a metal surface, comprising:
exposing the metal surface to boiling water or anodization to form a boehmite layer;
controlling the concentration of carbon dioxide in an aqueous solution; then
combining calcium hydroxide with the aqueous solution to form an aqueous calcium hydroxide solution; and then
contacting the metal surface with the aqueous calcium hydroxide solution.

38. The method of claim 23, further comprising:
controlling exposure of the aqueous calcium hydroxide solution to carbon dioxide.

39. A method for treating a metal surface, comprising:
controlling the concentration of carbon dioxide in an aqueous solution; then
combining calcium hydroxide with the aqueous solution to form an aqueous calcium hydroxide solution;
providing an inert gas atmosphere over the aqueous calcium hydroxide solution; and then
contacting the metal surface with the aqueous calcium hydroxide solution.

40. The method of claim 23, wherein the step of controlling the concentration of carbon dioxide in an aqueous solution comprises reducing the concentration of carbon dioxide in the aqueous solution.

41. A method for treating a conversion coating, comprising:
obtaining an aqueous solution having a carbon dioxide concentration below about 0.855 g/l; then
combining calcium hydroxide with the aqueous solution to form an aqueous calcium hydroxide solution; and then providing contact between the conversion coating and the aqueous calcium hydroxide solution.

42. A method forming a stable conversion coating on a metal substrate, comprising:

forming a conversion coating using a conversion coating solution having one or more oxidants selected from permanganates, molybdates, polyoxometalates, heteropolyoxometalates, ferrates, cerium compounds, alkaline solutions of lithium salts, zirconates, and combinations thereof;

treating the conversion coating with an aqueous calcium hydroxide solution prepared by combining calcium hydroxide with an aqueous solution having less than 1.73 grams of carbon dioxide per liter.

43. The method of claim 42, wherein the aqueous solution has a carbon dioxide concentration less than 0.85 grams per liter.

44. The method of claim 42, wherein the aqueous solution has a carbon dioxide concentration less than 0.45 grams per liter.

45. A method for preparing a conversion coating solution, comprising:

controlling the concentration of carbon dioxide in an aqueous solution; then combining calcium hydroxide with the aqueous solution to form an aqueous calcium hydroxide solution.

46. The method of claim 45, wherein the step of controlling the concentration of carbon dioxide in the aqueous solution comprises heating the aqueous solution.

47. The method of claim 46, wherein the aqueous solution is heated to a temperature between 50 and 100° C.

48. The method of claim 45, wherein the step of controlling the concentration of carbon dioxide in the aqueous solution comprises passing the aqueous solution through an electroosmotic pump.

49. The method of claim 45, wherein the step of controlling the concentration of carbon dioxide in the aqueous solution comprises sparging the solution using an inert gas.

50. The method of claim 22, wherein the carbon dioxide concentration is below about 0.454 g/l.

51. The method of claim 41, wherein the carbon dioxide concentration is below about 0.454 g/l.

52. The method of claim 31, wherein the ferrous metal is steel.

* * * * *